April 29, 1941.                P. MARSHALL                2,239,681
                            POWER DRIVEN HACK SAW
                  Filed Oct. 25, 1939            2 Sheets-Sheet 1
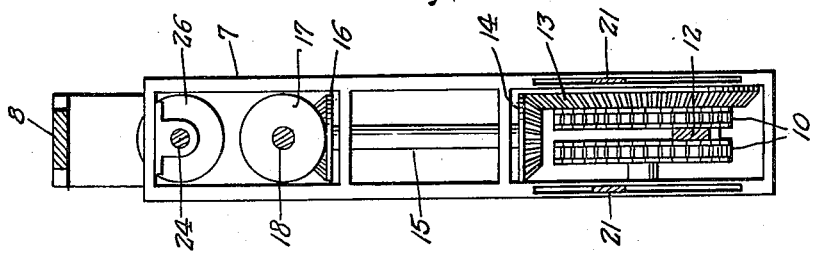
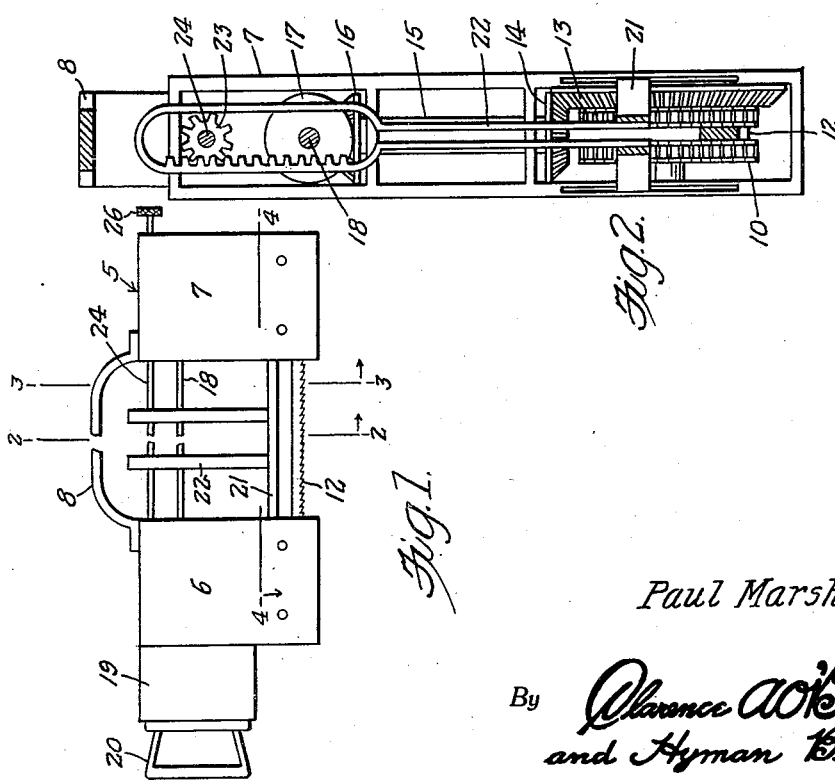
Inventor
Paul Marshall.
By Clarence A. O'Brien
and Hyman Berman
Attorneys April 29, 1941.                P. MARSHALL                2,239,681
                          POWER DRIVEN HACK SAW
                Filed Oct. 25, 1939            2 Sheets-Sheet 2
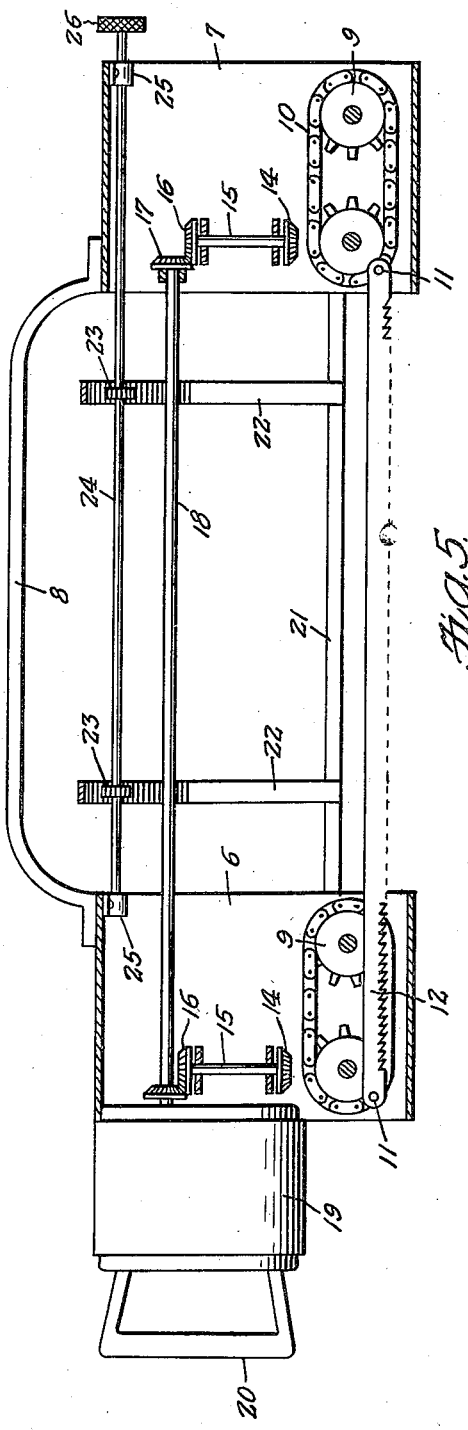
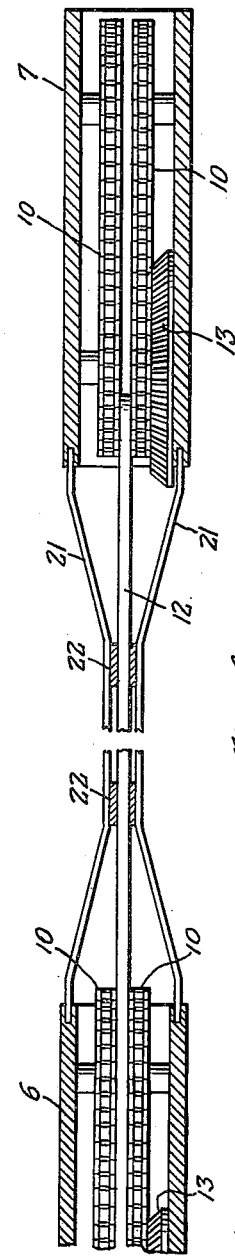
Inventor
*Paul Marshall,*
By *Clarence A. O'Brien*
and *Hyman Berman*
                                    *Attorneys*

Patented Apr. 29, 1941

2,239,681

UNITED STATES PATENT OFFICE 2,239,681

POWER DRIVEN HACK SAW

Paul Marshall, Dexter, N. Mex.

Application October 25, 1939, Serial No. 301,272

2 Claims. (Cl. 29—73)

This invention relates to a power driven hack saw, and has for the primary object the provision of a device of this character which may be easily and conveniently handled with the various parts thereof readily accessible for adjustment and repair and includes adjustable means for guiding the saw blade on its non-cutting stroke and which acts to regulate the cutting depth of the blade and may be conveniently adjusted so that the blade may cut to various depths.

Another object of this invention is the provision of a power drive which elevates the blade in the cut made thereby during its non-cutting stroke with the blade guided during said stroke.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a power driven hack saw constructed in accordance with my invention.

Figure 2 is a transverse sectional view taken on the line 2—2 of Figure 1.

Figure 3 is a transverse sectional view taken on the line 3—3 of Figure 1.

Figure 4 is a sectional view taken on the line 4—4 of Figure 1.

Figure 5 is a vertical sectional view illustrating the device.

Referring in detail to the drawings, the numeral 5 indicates in entirety the frame of the hack saw and includes primarily end members 6 and 7 both of which are of substantially frame-like constructions including side plates connected by top and bottom plates all of integral construction. The end members 6 and 7 are joined by a tie member 8 so as to provide a rigid construction.

Arranged within the end members 6 and 7 are pairs of sprocket gears 9 over which are trained sprocket chains 10 equipped with suitable fastening means 11 for detachably connecting thereto a hack saw blade 12. The rotation of the sprocket chains brings about reciprocation of the hack saw blade and one sprocket gear of each pair of sprocket gears has secured thereto bevel gears 13 which mesh with pinions 14 secured on the shafts 15 journaled within the end members and also are equipped with bevel gears 16 meshing with bevel gears 17 secured on a drive shaft 18 connected to the shaft of an electric motor 19 in any well known manner. The electric motor 19 is mounted on one of the end members and is equipped with a handle 20 for the handling and controlling of the device. It is to be understood that the electric motor may be readily connected to a conventional electric output through an extension cord having a control switch.

Slidably mounted in grooves provided in the end members 6 and 7 are guide members 21 between which moves the hack saw blade while on its non-cutting stroke. The guide members 21 being arranged in the grooves of the end members may be adjusted vertically and have secured thereto rack bars 22 engaged by gears 23 secured on a shaft 24. The shaft 24 is journaled in bearings 25 carried by the end members and is equipped with a finger piece 26 so that the shaft may be rotated in opposite directions for the purpose of raising and lowering the guide members 21 in the grooves of the end members 6 and 7. The guide members act to guide the movement of the saw blade on its non-cutting stroke and also act as means for limiting the cutting action of the blade as to depth in the work.

In use, the operator grips the device by the handle 20 with one hand and the finger piece 26 of the shaft 24 by the fingers of the other hand, whereby the shaft 24 may be held against accidental rotation. When starting a cut in a piece of work, the finger piece 26 is rotated to lower the members 21 until the teeth of the blade project slightly below said members 21 when the blade is on its cutting stroke. With the motor 19 in operation the teeth of the blade are brought into engagement with the work between the end members 6 and 7. After the blade has started to cut the work, the members 21 come in contact with the work and the operator rotates the finger piece 26 in a reverse direction to permit the blade to progress in its cutting action on the work, it being understood in order for the cutting of the work to progress, the finger piece 26 must be gradually rotated in the latter-named direction in order for the blade to advance into the work.

Whenever the operator stops rotating the finger piece 26, the members 21 being in engagement with the work then act to limit the cutting depth of the blade into the work.

It is believed that the foregoing description, when taken in connection with the drawings will fully set forth the construction and advantages of this invention to those skilled in the art to which such device relates, so that further detailed description will not be required.

Having thus described my invention, what I claim is:

1. A hack saw comprising a frame construction, pairs of endless drive elements carried by said frame construction, a hack saw connected to said endless elements for reciprocation thereby, an electric motor including a handle mounted on said frame construction, a drive means connecting the electric motor to said endless drive elements, guide means slidably connected to the frame construction for guiding the movement of the saw blade during its non-cutting stroke, and for limiting the cutting action of said blade in work and means for adjusting said guide means with respect to the saw blade and the work acted on by said blade.

2. A hack saw comprising frame members, a tie means between said frame members, endless sprocket chains mounted in said frame members, a hack saw blade connected to said endless sprocket chains, an electric motor connected to one of said frame members, a drive means connecting said motor to said endless sprocket chains, spaced guide members slidably supported on the frame construction, for controlling the cutting action of the blade in work, rack bars secured to said guide members, an operating shaft carried by the frame members for rotation in opposite directions, gearing connecting said shaft to the rack bars.

PAUL MARSHALL.